United States Patent
Schumacher et al.

(10) Patent No.: US 7,501,186 B2
(45) Date of Patent: Mar. 10, 2009

(54) PRESSURE SENSITIVE ADHESIVES COMPRISING MELAMINE RESIN

(75) Inventors: Karl-Heinz Schumacher, Neustadt (DE); Heiko Diehl, St. Martin (DE); Andree Dragon, Speyer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 222 days.

(21) Appl. No.: 10/926,068

(22) Filed: Aug. 26, 2004

(65) Prior Publication Data

US 2005/0070639 A1    Mar. 31, 2005

(30) Foreign Application Priority Data

Sep. 30, 2003   (DE) ................ 103 45 799

(51) Int. Cl.
*B32B 27/08*   (2006.01)

(52) U.S. Cl. ..................... 428/518; 428/343

(58) Field of Classification Search .............. 428/343, 428/518
See application file for complete search history.

(56) References Cited

U.S. PATENT DOCUMENTS

| | | | | |
|---|---|---|---|---|
| 4,049,847 | A | * | 9/1977 | Eisentraeger et al. .... 427/208.4 |
| 4,077,926 | A | * | 3/1978 | Sanderson et al. .......... 524/558 |
| 4,396,675 | A | * | 8/1983 | Groff .......................... 428/346 |
| 4,564,409 | A | | 1/1986 | Kuhl |
| 5,594,061 | A | * | 1/1997 | Sharma et al. .............. 524/503 |

FOREIGN PATENT DOCUMENTS

| | | | |
|---|---|---|---|
| DE | 25 26 747 A1 | | 12/1976 |
| DE | 44 26 186 | | 1/1996 |
| DE | 102 29 733 | | 1/2004 |
| EP | 0 081 083 | | 6/1983 |
| JP | 05051566 A | * | 3/1993 |
| JP | 10316774 A | * | 12/1998 |

OTHER PUBLICATIONS

Patent Abstracts of Japan, JP 05-051566, Mar. 2, 1993.

* cited by examiner

*Primary Examiner*—Bernard Lipman
(74) *Attorney, Agent, or Firm*—Oblon, Spivak, McClelland, Maier & Neustadt, P.C.

(57) ABSTRACT

An adhesive comprising
- A) a polymer obtainable by free-radical addition polymerization and synthesized from at least 60% by weight of principal monomers selected from
  C1 to C20 alkyl(meth)acrylates, vinyl esters of carboxylic acids containing up to 20 carbon atoms, vinylaromatics having up to 20 carbon atoms, ethylenically unsaturated nitriles, vinyl halides, vinyl ethers of alcohols containing 1 to 10 carbon atoms, aliphatic hydrocarbons having 2 to 8 carbon atoms and one or two double bonds, and mixtures of these monomers, and
- B) an aminotriazine resin.

8 Claims, No Drawings

PRESSURE SENSITIVE ADHESIVES COMPRISING MELAMINE RESIN

The invention relates to an adhesive comprising
A) a polymer obtainable by free-radical addition polymerization and synthesized from at least 60% by weight of principal monomers selected from
   C1 to C20 alkyl (meth)acrylates, vinyl esters of carboxylic acids containing up to 20 carbon atoms, vinylaromatics having up to 20 carbon atoms, ethylenically unsaturated nitriles, vinyl halides, vinyl ethers of alcohols containing 1 to 10 carbon atoms, aliphatic hydrocarbons having 2 to 8 carbon atoms and one or two double bonds, and mixtures of these monomers, and
B) an aminotriazine resin.

The invention further relates to the use of such adhesives for producing self-adhesive articles comprising plasticized PVC as backing material.

For outdoor applications use is frequently made of self-adhesive labels and tapes and also printed sheets comprising plasticized PVC backing material. Plasticized PVC sheets comprise low molecular mass plasticizers based on phthalate or polymeric plasticizers. A problem which occurs as a result of the use of these plasticizers is that the plasticizer can migrate from the sheet into the adhesive. This impairs the adhesive performance properties. Not only the cohesion of the adhesive but also its adhesion to the surface to which the label or sheet is adhered are reduced, generally markedly so, by the migration of the plasticizer into the adhesive.

In the outdoor sector the self-adhesive articles are also exposed to the effect of moisture.

Water exposure of the adhesive film leads to an unwanted white clouding which is referred to as blushing.

In self-adhesive articles comprising polymer films, particularly plasticized PVC backing material, a frequent occurrence is the contraction of the film in subsequent use. Contraction is observed in particular when the self-adhesive articles are exposed to elevated temperatures in use.

There is therefore a desire for adhesives which lead to self-adhesive articles having improved shrinkage behavior.

Adhesives for producing self-adhesive articles with plasticized PVC backing material are known, for example, from DE-A-10229733 (PF 53677).

Polymer dispersions comprising aminotriazines are described in DE-A-4426186 (PF 45063) as binders for coating materials.

It is an object of the present invention to provide adhesives for self-adhesive articles with minimal shrinkage and excellent water resistance (to blushing). The adhesives ought further to have good adhesion and cohesion, and good processing properties.

We have found that this object is achieved by the adhesives defined at the outset and by their use.

The adhesive of the invention comprises a polymer and an aminotriazine derivative.

The polymer is obtainable by free-radical addition polymerization of ethylenically unsaturated compounds (monomers).

The polymer is composed of at least 60%, preferably at least 80%, more preferably at least 90% by weight of what are termed principal monomers.

The principal monomers are selected from $C_1$ to $C_{20}$ alkyl (meth)acrylates, vinyl esters of carboxylic acids containing up to 20 carbon atoms, vinylaromatics having up to 20 carbon atoms, ethylenically unsaturated nitriles, vinyl halides, vinyl ethers of alcohols containing 1 to 10 carbon atoms, aliphatic hydrocarbons having 2 to 8 carbon atoms and one or two double bonds, and mixtures of these monomers.

Examples include (meth)acrylic acid alkyl esters having a $C_1$-$C_{10}$ alkyl radical, such as methyl methacrylate, methyl acrylate, n-butyl acrylate, ethyl acrylate, and 2-ethylhexyl acrylate.

In particular, mixtures of the (meth)acrylic acid alkyl esters are also suitable.

Vinyl esters of carboxylic acids having 1 to 20 carbon atoms are for example vinyl laurate, vinyl stearate, vinyl propionate, Versatic acid vinyl esters, and vinyl acetate.

Suitable vinylaromatic compounds include vinyltoluene, α- and p-methylstyrene, α-butylstyrene, 4-n-butylstyrene, 4-n-decylstyrene, and, preferably styrene. Examples of nitriles are acrylonitrile and methacrylonitrile.

The vinyl halides are ethylenically unsaturated compounds substituted by chlorine, fluorine or bromine, preferably vinyl chloride and vinylidene chloride.

Examples of vinyl ethers include vinyl methyl ether and vinyl isobutyl ether. Preference is given to vinyl ether of alcohols containing 1 to 4 carbon atoms.

Hydrocarbons that may be mentioned, having 4 to 8 carbon atoms and two olefinic double bonds, include butadiene, isoprene, and chloroprene.

Preferred principal monomers are the $C_1$ to $C_{10}$ alkyl acrylates and methacrylates, particularly $C_1$ to $C_8$ alkyl acrylates and methacrylates, and vinylaromatics, especially styrene, and also mixtures thereof.

Very particular preference is given to methyl acrylate, methyl methacrylate, ethyl acrylate, n-butyl acrylate, n-hexyl acrylate, octyl acrylate, and 2-ethylhexyl acrylate, to styrene, and to mixtures of these monomers.

The polymer may contain further monomers in addition to the principal monomers, examples being monomers containing carboxylic, sulfonic or phosphonic acid groups. Carboxylic acid groups are preferred. Examples that may be mentioned include acrylic acid, methacrylic acid, itaconic acid, maleic acid, and fumaric acid.

Examples of further monomers also include hydroxyl-containing monomers, particularly $C_1$-$C_{10}$ hydroxyalkyl (meth)acrylates, and (meth)acrylamide.

Yet further additional monomers that may be mentioned include phenyloxyethyl glycol mono(meth)acrylate, glycidyl acrylate, glycidyl methacrylate, and amino (meth)acrylates such as 2-aminoethyl (meth)acrylate.

As further monomers mention may also be made of crosslinking monomers.

The polymer preferably includes hydrophilic groups selected from carboxyl, hydroxyl, amino, and carboxamido groups. The amount of these hydrophilic groups is in particular from 0.001 to 0.5 mol per 100 g of polymer. The amount is preferably at least 0.005 mol, more preferably at least 0.008 mol, and not more than 0.2 mol, in particular not more than 0.1 mol, with very particular preference not more than 0.05 or 0.03 mol per 100 g of polymer.

With particular preference the hydrophilic groups are selected from carboxyl, hydroxyl, and carboxamido groups.

With particular preference at least 20 mol % of the total molar amount of these reactive groups is made up of carboxyl groups.

By carboxyl groups are meant both carboxylic acid groups and also salts thereof. Where salts are concerned they are preferably salts with volatile bases, ammonia being one example.

The reactive groups can be attached to the polymer by copolymerization of the corresponding monomers.

Preferred monomers containing hydrophilic groups are the abovementioned monomers having carboxyl and hydroxyl groups, a particular example being acrylic acid.

In particular the polymer is synthesized from at least 60%, more preferably at least 80%, and very preferably at least 95% by weight of $C_1$ to $C_{20}$ alkyl (meth)acrylates.

In one preferred embodiment the polymer is prepared by emulsion polymerization, and is therefore an emulsion polymer.

Emulsion polymerization uses ionic and/or nonionic emulsifiers and/or protective colloids, or stabilizers, as surface-active compounds.

A detailed description of suitable protective colloids can be found in Houben-Weyl, Methoden der organischen Chemie, volume XIV/1, Makromolekulare Stoffe [Macromolecular Compounds], Georg-Thieme-Verlag, Stuttgart, 1961, pp. 411 to 420. Suitable emulsifiers include anionic, cationic, and nonionic emulsifiers. As accompanying surface-active substances it is preferred to use exclusively emulsifiers, whose molecular weights, unlike those of the protective colloids, are normally below 2 000 g/mol. Where mixtures of surface-active substances are used the individual components must of course be compatible with one another, something which in case of doubt can be checked by means of a few preliminary tests. It is preferred to use anionic and nonionic emulsifiers as surface-active substances. Common accompanying emulsifiers are, for example, ethoxylated fatty alcohols (EO units: 3 to 50, alkyl: $C_8$ to $C_{36}$), ethoxylated mono-, di- and tri-alkylphenols (EO units: 3 to 50, alkyl: $C_4$ to $C_9$), alkali metal salts of dialkyl esters of sulfosuccinic acid, and also alkali metal salts and ammonium salts of alkyl sulfates (alkyl: $C_8$ to $C_{12}$), of ethoxylated alkanols (EO units: 4 to 30, alkyl: $C_{12}$ to $C_{18}$), of ethoxylated akylphenols (EO units: 3 to 50, alkyl: $C_4$ to $C_9$), of alkylsulfonic acids (alkyl: $C_{12}$ to $C_{18}$), and of alkylarylsulfonic acids (alkyl: $C_9$ to $C_{18}$).

Further suitable emulsifiers are compounds of the formula II

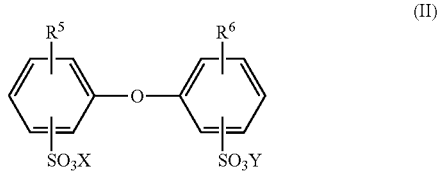

(II)

in which $R^5$ and $R^6$ are hydrogen or $C_4$ to $C_{14}$ alkyl but are not simultaneously hydrogen, and X and Y can be alkali metal ions and/or ammonium ions. With preference, $R^5$ and $R^6$ are linear or branched alkyl radicals having 6 to 18 carbon atoms or hydrogen, and in particular having 6, 12, and 16 carbon atoms, $R^5$ and $R^6$ not both simultaneously being hydrogen. X and Y are preferably sodium, potassium or ammonium ions, sodium being particularly preferred. Particularly advantageous compounds II are those in which X and Y are sodium, $R^5$ is a branched alkyl radical having 12 carbon atoms, and $R^6$ is hydrogen or $R^5$. Use is frequently made of technical-grade mixtures containing a fraction of from 50 to 90% by weight of the monoalkylated product, an example being Dowfax® 2A1 (trademark of the Dow Chemical Company).

Suitable emulsifiers can also be found in Houben-Weyl, Methoden der organischen Chemie, volume 14/1, Makromolekulare Stoffe, Georg Thieme Verlag, Stuttgart, 1961, pages 192 to 208.

Examples of emulsifier trade names include Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol VSL, and Emulphor NPS 25.

For the present invention preference is given to ionic emulsifiers or protective colloids. With particular preference they are ionic emulsifiers, in particular salts and acids, such as carboxylic acids, sulfonic acids, and sulfates, sulfonates or carboxylates.

The surface-active substance is normally used in amounts of from 0.1 to 10 parts by weight, preferably from 0.2 to 5 parts by weight, per 100 parts by weight of the monomers to be polymerized.

Water-soluble initiators for the emulsion polymerization are, for example, ammonium salts and alkali metal salts of peroxodisulfuric acid, e.g., sodium peroxodisulfate, hydrogen peroxide, or organic peroxides, e.g., tert-butyl hydroperoxide.

Also suitable are what are called reduction-oxidation (redox) initiator systems.

The redox initiator systems are composed of at least one, usually inorganic reducing agent and one organic or inorganic oxidizing agent.

The oxidizing component comprises, for example, the emulsion polymerization initiators already mentioned above.

The reducing component comprises, for example, alkali metal salts of sulfurous acid, such as sodium sulfite, sodium hydrogensulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems may be used together with soluble metal compounds whose metallic component is able to exist in a plurality of valence states.

Examples of customary redox initiator systems-include ascorbic acid/iron(II) sulfate/sodium peroxodisulfate, tert-butyl hydroperoxide/sodium disulfite, and tert-butyl hydroperoxide/Na hydroxymethanesulfinate. The individual components, the reducing component for example, may also be mixtures: for example, a mixture of the sodium salt of hydroxymethanesulfinic acid with sodium disulfite.

The compounds stated are mostly used in the form of aqueous solutions, the lower concentration being determined by the amount of water that is acceptable in the dispersion and the upper concentration by the solubility of the respective compound in water. The concentration is generally from 0.1 to 30% by weight, preferably from 0.5 to 20% by weight, more preferably from 1.0 to 10% by weight, based on the solution.

The amount of the initiators is generally from 0.1 to 10% by weight, preferably from 0.5 to 5% by weight, based on the monomers to be polymerized. It is also possible for two or more different initiators to be used in the emulsion polymerization.

For the polymerization it is possible to use regulators, in amounts for example of from 0 to 0.8 part by weight, per 100 parts by weight of the monomers to be polymerized. These regulators lower the molar mass. Suitable examples include compounds containing a thiol group, such as tert-butyl mercaptan, thioglycolic acid ethylacrylic ester, mercaptoethynol, mercaptopropyltrimethoxysilane, and tert-dodecyl mercaptan.

The emulsion polymerization takes place in general from 30 to 130° C., preferably from 50 to 90° C. The polymerization medium may be composed either of water alone or of mixtures of water with water-miscible liquids such as methanol. It is preferred to use just water. The emulsion polymerization may be conducted either as a batch operation or in the form of a feed process, including staged or gradient procedures. Preference is given to the feed process, in which a portion of the polymerization mixture is introduced as an initial charge and heated to the polymerization temperature, the polymerization of this initial charge is begun, and then the remainder of the polymerization mixture is supplied to the polymerization zone, usually by way of two or more spatially separate feed streams, of which one or more contain the monomers in neat form or emulsified form, this addition being made continuously, in stages or under a concentration gradient, and polymerization being maintained during said addition. It is also possible, in order for example to set the particle size more effectively, to include a polymer seed in the initial charge to the polymerization.

The manner in which the initiator is added to the polymerization vessel in the course of the free-radical aqueous emulsion polymerization is known to the skilled worker. It may either be included in its entirety in the initial charge to the polymerization vessel or else introduced, continuously or in stages, at the rate at which it is consumed in the course of the free-radical aqueous emulsion polymerization. In each specific case this will depend both on the chemical nature of the initiator system and on the polymerization temperature. It is preferred to include one portion in the initial charge and to supply the remainder to the polymerization zone at the rate at which it is consumed.

In order to remove the residual monomers it is common to add initiator after the end of the actual emulsion polymerization as well, i.e., after a monomer conversion of at least 95%.

With the feed process, the individual components can be added to the reactor from the top, through the side, or from below, through the reactor floor.

In the case of emulsion polymerization, aqueous polymer dispersions with solids contents generally of from 15 to 75% by weight are obtained, preferably from 40 to 75% by weight.

For a high reactor space/time yield, dispersions with as high as possible a solids content are preferred. In order to be able to achieve solids contents >60% by weight, a bimodal or polymodal particle size ought to be set, since otherwise the viscosity becomes too high and the dispersion can no longer be handled. Producing a new generation of particles can be done, for example, by adding seed (EP 81083), by adding excess quantities of emulsifier, or by adding miniemulsions. Another advantage associated with the low viscosity at high solids content is the improved coating behavior at high solids contents. One or more new generations of particles can be produced at any point in time. It is guided by the particle size distribution which is targeted for a low viscosity.

The polymer thus prepared is used preferably in the form of its aqueous dispersion.

The mean particle size of the polymer particles dispersed in the aqueous dispersion is preferably less than 300 nm, in particular less than 200 nm. With particular preference the mean particle size is between 140 and 200 nm.

This mean particle size is the $d_{50}$ value of the particle size distribution: that is, 50% by weight of the total mass of all particles have a diameter smaller than the $d_{50}$ figure. The particle size distribution can be determined in conventional manner using an analytical ultracentrifuge (W. Mächtle, Makromolekulare Chemie 185 (1984), pages 1025-1039).

The pH of the polymer dispersion is preferably set to a value of more than 4.5, in particular to between 5 and 8.

The glass transition temperature of the polymer is preferably from −60 to 0° C., more preferably from −60 to −10° C., and very preferably from −60 to −20° C.

The glass transition temperature can be determined by customary methods such as differential thermoanalysis or differential scanning calorimetry (see, for example, ASTM 3418/82, midpoint temperature).

The adhesive of the invention further comprises an aminotriazine.

Suitable aminotriazines include for example melamine, benzoguanamine, acetoguanamine, and bisguanamines such as adipo-, glutaro- or methylglutaro-bisguanamine, and spiroguanamines. Also suitable are compounds including two or more aminotriazine nuclei, said nuclei being fused, for example. The aminotriazines are preferably at least partly methylolated and etherified.

Preference is given to at least partly methylolated and etherified melamine and to corresponding compounds containing two or more melamine nuclei, e.g., 2 to 5 melamines bridged via methylol groups, or to mixtures thereof. Preferred aminotriazines contain on average 1 to 3, in particular 1, melamine nucleus (nuclei) per molecule.

The aminotriazines are methylolated on average with at least 1 mol, preferably at least 1.4 mol, more preferably at least 1.7 mol of formaldehyde per mole of primary amino groups, and these methylol groups are etherified on average with at least 0.5 mol, preferably at least 0.6 mol, and more preferably at least 0.7 mol of primary alcohols per mole of methylol group.

Particularly preferred primary alcohols are alkanols, especially $C_1$-$C_4$ alkanols. Particular preference is given to methanol.

An example of a suitable aminotriazine is hexamethoxymethylolmelamine (each amino group of the melamine being methylolated with 2 formaldehyde groups and each methylol group being etherified with methanol).

Preferred aminotriazine resins have a water solubility of at least 500 g/liter (21° C., 1 bar).

The aminotriazine resins are generally used in the form of their aqueous solutions.

The solids content of these solutions is generally between 50 and 90% by weight, based on the weight of the total solution.

The solution of the aminotriazine resin can simply be added to the aqueous dispersion of the polymer.

The amount of the aminotriazine resin is preferably from 0.5 to 40 parts by weight (solids), more preferably from 0.5 to 10 parts by weight, and very preferably from 0.5 to 5 parts by weight per 100 parts by weight of polymer. The minimum amount is in particular at least 0.7 part, or 1 part by weight.

The mixing of the polymer with the aminotriazine resin may be carried out at any time. The mixture retains its processing properties. Even at 50° C. the potlife (i.e., the time for which the mixture retains its processing properties) is more than 3 days; at 20° C., the potlife runs to months.

The adhesives, preferably pressure sensitive adhesives (PSAs), may be composed solely of the polymer or aqueous polymer dispersion and of the aminotriazine resin.

The adhesives, including PSAs, may comprise further additives: fillers, colorants, flow control agents, thickeners or tackifiers (tackifying resins). Examples of tackifiers include natural resins, such as rosins and their derivatives formed by disproportionation or isomerization, polymerization, dimerization and/or hydrogenation. They may be present in their salt form (with, for example, monovalent or polyvalent counterions (cations)) or, preferably, in their esterified form. Alcohols used for the esterification may be monohydric or polyhydric. Examples are methanol, ethanediol, diethylene glycol, triethylene glycol, 1,2,3-propanetriol, and pentaerythritol.

Also used are hydrocarbon resins, e.g., coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene, and vinyltoluene.

Other compounds increasingly being used as tackifiers include polyacrylates which have a low molar weight. These polyacrylates preferably have a weight-average molecular weight $M_w$ of less than 30 000. With preference the polyacrylates are composed of at least 60% by weight, in particular at least 80% by weight, of $C_1$-$C_8$ alkyl (meth)acrylates.

Preferred tackifiers are natural or chemically modified rosins. Rosins are composed predominantly of abietic acid or its derivatives.

The amount by weight of the tackifiers is preferably from 5 to 100 parts by weight, more preferably from 10 to 50 parts by weight, per 100 parts by weight of polymer (solids/solids).

The adhesive or PSA is especially suitable for joining substrates when at least one of the substrate surfaces to be joined is made of plasticized PVC. For example, the adhesive may be applied to a backing, made of paper or plastic, for example, and the backing thus coated (e.g., a label, adhesive tape or film) may be adhered to a substrate made of plasticized PVC.

The adhesives or PSAs of the invention are especially suitable for producing self-adhesive articles, such as labels, adhesive tapes or adhesive sheets, e.g., protective sheets.

The self-adhesive articles are generally composed of a backing and of a layer of the adhesive applied to one or both sides, preferably one side.

The backing material may comprise, for example, paper, or preferably polymeric films made of polyolefins or PVC, particular preference being given to PVC and very particular preference to plasticized PVC.

By plasticized PVC is meant polyvinyl chloride which includes plasticizers and has a reduced softening temperature. Examples of common plasticizers include phthalates, epoxides, and adipates. The amount of plasticizers in the plasticized PVC is generally more than 10% by weight and in particular more than 20% by weight.

With plasticized PVC, plasticizers can migrate into the layer of adhesive and significantly impair its properties. With the adhesive of the invention, plasticizer migration has virtually no effect, if any at all, on the properties of the adhesive. Moreover, particularly in the case of plasticized PVC, contraction of the substrates is reduced or prevented by the adhesive of the invention.

The present invention accordingly provides, in particular, self-adhesive articles comprising plasticized PVC backing material with, coated thereon, a layer of the above adhesive.

To produce the layer of adhesive on the backing material it is possible to coat the backing material conventionally.

The coated substrates obtained are used, for example, as self-adhesive articles, such as labels, adhesive tapes or sheets.

The self-adhesive articles comprising plasticized PVC backing material are especially suitable for outdoor applications.

In particular, printed self-adhesive sheets can be used outdoors and adhered, for example, to advertising boards or vehicles of all kinds.

The self-adhesive articles of the invention have good performance properties, including in particular a good peel strength (adhesion) and shear strength (cohesion). The properties remain good even where the backing material is plasticized PVC.

Clouding in the layer of adhesive as a result of moisture exposure (i.e., blushing) is observed rarely if at all. Consequently the layer of adhesive is highly water resistant. Hardly any contraction of the self-adhesive articles is observed, even when they are exposed to high temperatures, e.g., more than 50° C.

EXAMPLES

Raw Materials:
 ACRONAL® DS 3559: a carboxyl-containing polyacrylate based on ethylhexyl acrylate, solids content 51%.
 LUWIPAL® 073: a partially methylol-etherified melamine resin, solids content 80%.
 SADUREN® 163: a partially methylol-etherified melamine resin, solids content 70%.

The mixtures were prepared by stirring the aminotriazine resin solutions into the polymer dispersion. Weight fractions indicated in the table refer to the whole resin solution or polymer dispersion respectively.

Test Methods

Dimensional Stability (Shrinkage Behavior):

To determine the dimensional stability by the cross-cut method, the adhesives are coated onto silicone paper (Laufenberg NSA 1370, white, with coating 56 B 4) at an application rate (dry) of 25 g/m². After drying at 90° C. for 3 minutes the layer of adhesive is transferred to plasticized PVC sheet (Renolit, white, SK-Monomer 80790). After 24 hours of storage at room temperature the silicone paper is removed and the coated plasticized PVC sheet is bonded without bubbles to a glass plate (25 cm×25 cm), applying pressure using a roller. It is important that the running direction of the sheet is noted and marked. The bonded sheet is then divided in the center in the lengthwise and crosswise directions, with one cut in each case, using a razor blade in a blade mill. After cutting, there should be four squares of equal size. The glass plates are subsequently stored at 70° C. After 3, 5, 10, and 14 days the glass plates are cooled at RT for about an hour and the width of the cut gap is measured in the cold state.

The lower the width of the gap, the better the shrinkage behavior.

Peel Strength and Shear Strength

Plasticized PVC was coated as described above with adhesive.

Thereafter the peel strength (adhesion) and shear strength (cohesion) were measured.

The coated backing was cut into test strips 25 mm wide. For measurement of the shear strength, the test strips were bonded with an area of 25 mm² to a test panel made of V2A stainless steel, rolled on once with a roller weighing 1 kg, stored for 10 minutes (under standard conditions, 50% relative humidity, 1 bar, 23° C.), and then exposed to a suspended weight of 1 kg (under standard conditions). The measure of the shear strength was the time taken for the weight to fall off; in each case, the average of 5 measurements was calculated.

For the determination of the peel strength (adhesion) a 2.5 cm wide test strip was adhered in each case to a steel test element and was rolled on once with a roller weighing 1 kg. After 1 minute and after 24 hours of storage under standard conditions, it was clamped by one end into the upper jaws of a tension-elongation testing apparatus. The adhesive strip was peeled from the test area at an angle of 180° and at a speed of 300 mm/min; in other words, the adhesive strip was bent back and peeled off parallel to the metal test panel, and the force required to do this was measured. The measure of the peel strength was the force in N/2.5 cm which resulted as the average value from five measurements. The test was again carried out under standard conditions.

| | Gap width, initial value prior to storage < 0.05 mm | | | | | | | | Adhesive data | | |
|---|---|---|---|---|---|---|---|---|---|---|---|
| | Gap width in mm after storage at 70° C. | | | | | | | | Peel strength in N/25 mm | | Shear strength in min 12.5 × 12.5 mm |
| | 3 days | | 5 days | | 10 days | | 14 days | | | | |
| Adhesive | vert. | horizont. | vert. | horizont. | vert. | horizont. | vert. | horizont. | 1 min | 24 h | 10'/1 kg |
| ACRONAL ® DS 3559 | 0.60 | 0.75 | 0.70 | 0.80 | 0.75 | 0.80 | 0.75 | 0.80 | 11.8 | 31.1 | 31 |
| +LUWIPAL ® 073 (100:1) | 0.30 | 0.35 | 0.35 | 0.40 | 0.40 | 0.45 | 0.40 | 0.45 | 11.2 | 22.1 | 98 |
| +LUWIPAL ® 073 (100:2) | 0.15 | 0.20 | 0.15 | 0.20 | 0.20 | 0.20 | 0.20 | 0.20 | 7.4 | 19.9 | 108 |
| +LUWIPAL ® 073 (100:3) | 0.10 | 0.10 | 0.10 | 0.10 | 0.10 | 0.10 | 0.10 | 0.10 | 5.5 | 19.2 | 145 |
| +SADUREN ® 163 (100:1) | 0.30 | 0.35 | 0.35 | 0.40 | 0.35 | 0.40 | 0.35 | 0.40 | 6.8 | 19.8 | 86 |
| +SADUREN ® 163 (100:2) | 0.10 | 0.15 | 0.15 | 0.15 | 0.15 | 0.20 | 0.15 | 0.20 | 6.6 | 17.3 | 252 |
| +SADUREN ® 163 (100:3) | 0.05 | 0.10 | 0.10 | 0.10 | 0.10 | 0.10 | 0.10 | 0.10 | 6.7 | 15.6 | 720 |

| | Peel strength in N/25 mm | | Shear strength in min 12.5 × 12.5 mm |
|---|---|---|---|
| | 1 min | 24 h | 10'/1 kg |
| Acronal DS 3559 | 11.8 | 31.1 | 31 |
| +Luwipal 073 (100:1) | 11.2 | 22.1 | 98 |
| +Luwipal 073 (100:2) | 7.4 | 19.9 | 108 |
| +Luwipal 073 (100:3) | 5.5 | 19.2 | 145 |
| +Saduren 163 (100:1) | 6.8 | 19.8 | 86 |
| +Saduren 163 (100:2) | 6.6 | 17.3 | 252 |
| +Saduren 163 (100:3) | 6.7 | 15.6 | 720 |

We claim:

1. A self-adhesive article comprising
a plasticized PVC backing material coated with an adhesive composed of
A) an emulsion polymer obtained by free-radical addition polymerization and synthesized from at least 60% by weight of principal monomers selected from C1 to C20 alkyl(meth)acrylates, vinyl esters of carboxylic acids containing up to 20 carbon atoms, vinylaromatics having up to 20 carbon atoms, ethylenically unsaturated nitriles, vinyl halides, vinyl ethers of alcohols containing 1 to 10 carbon atoms, aliphatic hydrocarbons having 2 to 8 carbon atoms and one or two double bonds, and mixtures of these monomers, wherein the polymer has a glass transition temperature of from –60° C. to 0° C.; and
B) only an aminotriazine resin as a crosslinker of the polymer.

2. The self-adhesive article as claimed in claim 1, wherein the polymer is synthesized from at least 60% by weight of C1 to C20 alkyl(meth)acrylates.

3. The self-adhesive article as claimed in claim 1, wherein the polymer contains from 0.001 to 0.5 mol of hydrophilic groups selected from carboxyl, hydroxyl, amino, and carboxamido groups per 100 g of polymer.

4. The self-adhesive article as claimed in claim 1, wherein said aminotriazine resin is a melamine resin.

5. The self-adhesive article as claimed in claim 1, wherein the amino groups of the aminotriazine resin are methylolated on average with at least 1 mol of formaldehyde per mole of amino group.

6. The self-adhesive article as claimed in claim 5, wherein the methylol groups are etherified on average with at least 0.5 mol of primary alcohol per mole of methylol group.

7. The self-adhesive article as claimed in claim 1, wherein the amino groups of the aminotriazine resin are fully methylolated and the methylol groups are fully etherified with a primary alcohol.

8. The self-adhesive article as claimed in claim 1, wherein the aminotriazine resin is present in amounts of from 0.5 to 40 parts by weight per 100 parts by weight of polymer.

* * * * *